United States Patent

[11] 3,594,080

| [72] | Inventor | Larry Max McMillin<br>Jefferson, Iowa |
|---|---|---|
| [21] | Appl. No. | 788,846 |
| [22] | Filed | Jan. 3, 1969 |
| [45] | Patented | July 20, 1971 |
| [73] | Assignee | Allied Research Associates, Inc.<br>Concord, Mass. |

[54] METHOD AND APPARATUS FOR DIGITAL COLOR PRINTING
6 Claims, 4 Drawing Figs.

[52] U.S. Cl. .................................................. 355/36,
346/107 R, 355/41, 355/71
[51] Int. Cl. .................................................. G03b 27/76
[50] Field of Search .......................................... 355/32, 40,
41, 71, 36, 38; 346/107

[56] References Cited
UNITED STATES PATENTS
2,641,976  6/1953  Bryce et al. .................. 355/32

Primary Examiner—Samuel S. Matthews
Assistant Examiner—Richard A. Wintercorn
Attorney—Kenway, Jenney & Hildreth ABSTRACT: A method of recording a color image utilizing information signals in digital form. The digital signals give information for a line of the image to be recorded. Under the control of these information signals, different colors are sequentially recorded through a line mask upon color film, each sequence corresponding to a digital encoding of the distribution of the corresponding color along the line in the image being recorded. The apparatus for practicing the method includes punchcard-scanning means for producing digital-coded colored light signals and distributing the appropriate colored light upon a photographic emulsion.

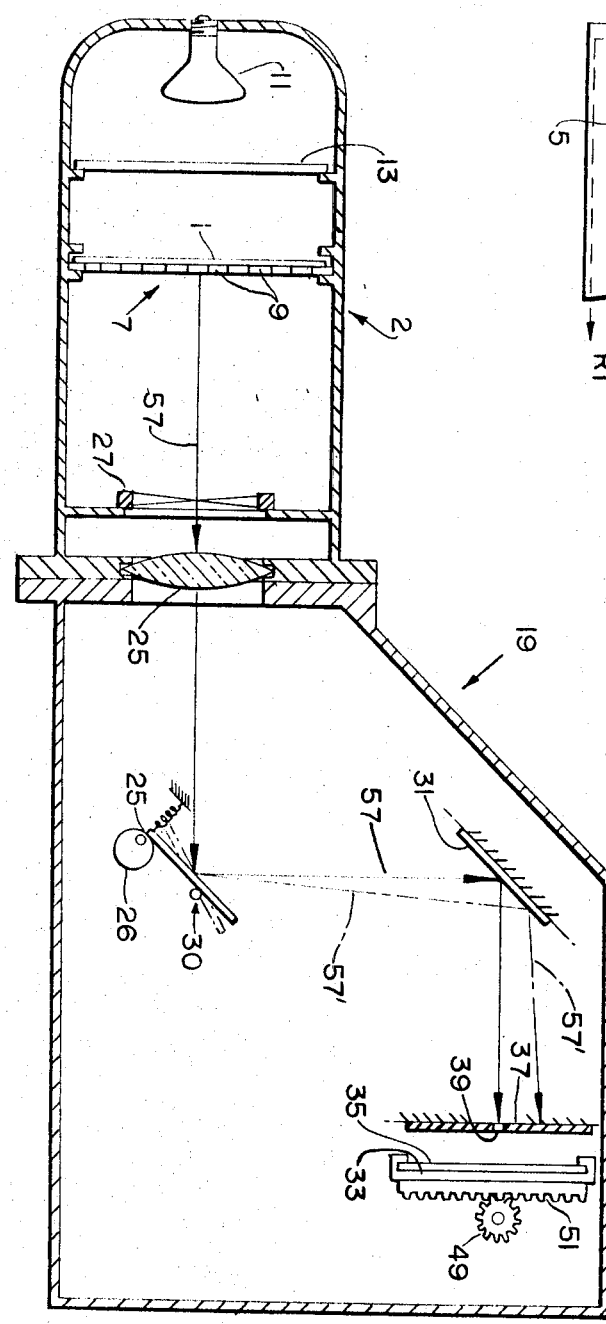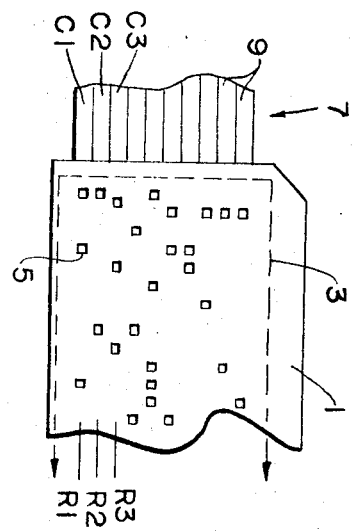

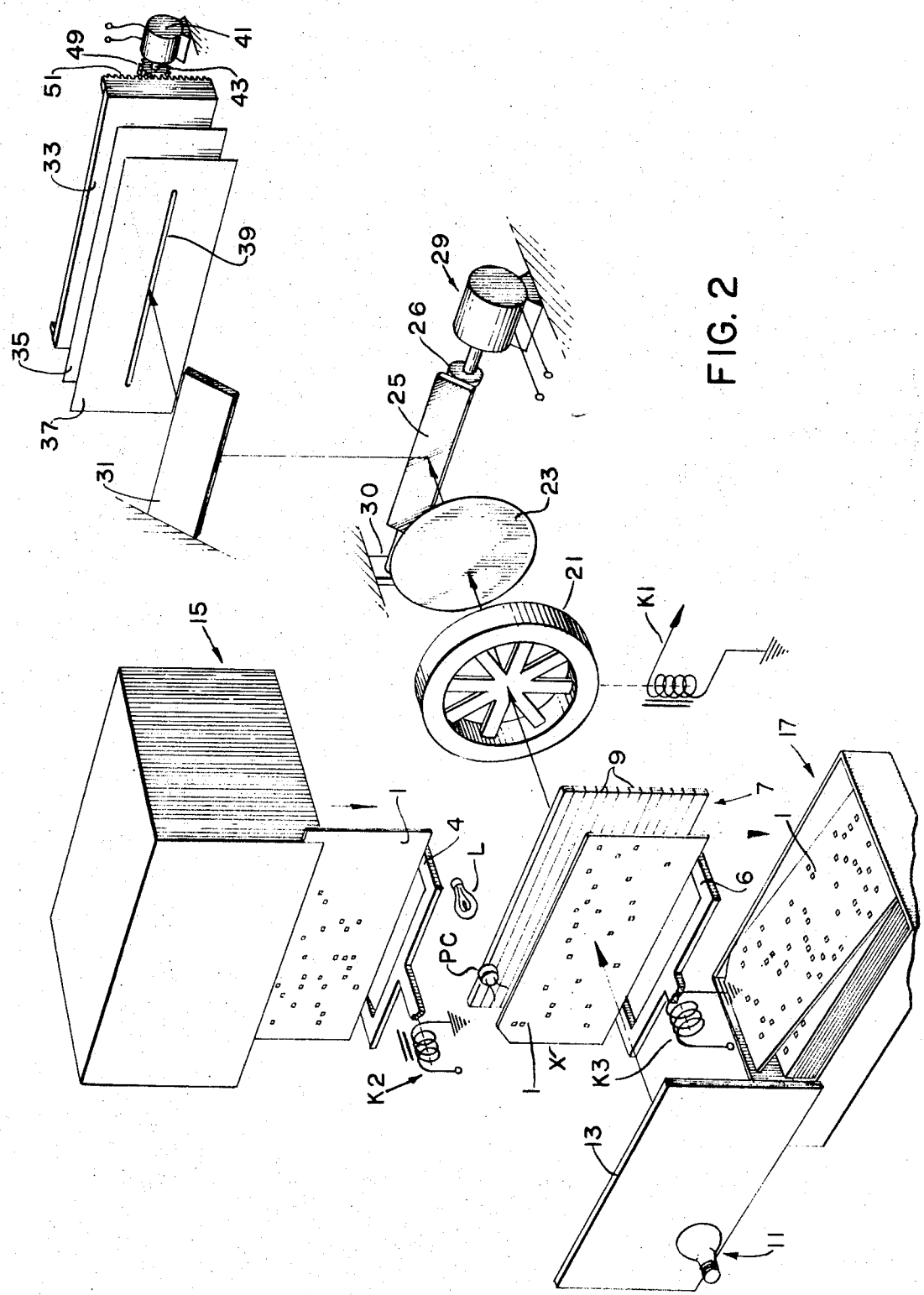

INVENTOR
LARRY MAX McMILLIN

METHOD AND APPARATUS FOR DIGITAL COLOR PRINTING

My invention relates to color printing, and more particularly to the art of producing an image in color from digitally recorded information descriptive of the image to be produced.

For a number of purposes, it is necessary to produce visual images from information that has been stored in the form of digital data. For example, the distribution of values of a variable such as temperature or pressure over a region of interest is commonly recorded and stored in digital form. When a qualitative evaluation of data of this kind is desired, it is useful to present it visually in graphic form. Thus, maps comprising labeled isotherms or isobars are frequently employed, as in weather forecasting. Such maps are normally reproduced monochromatically. However, while including all of the information stored, a monochromatic representation is not readily interpreted by an observer, because interpretation requires an abstract associative process to transform the monochromatic lines and labels into a qualitative concept. It would be highly desirable to have a more readily grasped graphic image in which all of the recorded information is presented in common optical terms, as in a chromatic image in which color, as well as line and form, contributes information. While color images have long been available, their production from digital data has heretofore involved considerable labor and expense. The object of my invention is to facilitate the production of colored images from digitally recorded data.

The above and other objects of my invention are obtained by a novel method and apparatus of my invention, to be described in more detail below, by means of which a color image is formed a line at a time on a color-sensitive emulsion through a mask including a slit located over the emulsion and defining the line to be recorded. While the slit is in position, each of a sequence of digital light signals is applied to the film along the line exposed by the slit. Each sequence corresponds to the distribution along the line of a different color, and is recorded by exposing the film, through a filter of that color, to a light source interrupted by a mask marked in terms of opaque regions, where the color is not to be transmitted, and transparent regions, where the color is to be transmitted. The line on the film defined by the current position of the slit is sequentially exposed to as many different colored signal sequences as may be desired. When the composite exposure just described has been completed for each line on the emulsion, and the emulsion has been developed, the result will be a color image reproducing the recorded image with a fidelity to the recorded original that is dependent upon the resolution inherent in the data provided and the number of lines per unit length recorded on the emulsion. The colors assigned to the different data sequences may be chosen to represent different values of a variable, such as temperature, to be mapped, whereby a readily grasped graphic presentation is made available. Alternatively, the colors may represent actual colors in a photographed scene, whereby the resultant image comprises a color print or transparency of the scene.

The manner in which the apparatus of my invention is constructed, and the preferred mode of carrying out the process of my invention, will best be understood in the light of the following detailed description, together with the accompanying drawings.

In the drawings;

FIG. 1 is a schematic fragmentary elevation in plan showing a portion of a punchcard bearing information to be printed, shown overlying a portion of a multiple element filter to illustrate the relation of those parts in the practice of my invention.

FIG. 2 is a schematic exploded perspective sketch of the color printing apparatus in accordance with my invention.

FIG. 3 is a schematic elevational view of a portion of the apparatus of FIG. 2, illustrating the manner in which the recorded image is produced.

FIG. 1 shows a portion of a digital recording medium here shown as a conventional punchcard 1 on which digital data is recorded by punching, or not punching, a hole in the card at each location on the card corresponding to a data bit. It will be apparent to those skilled in the art that the data could also be recorded on a photographic transparency as opaque or transparent regions.

Figure 4:
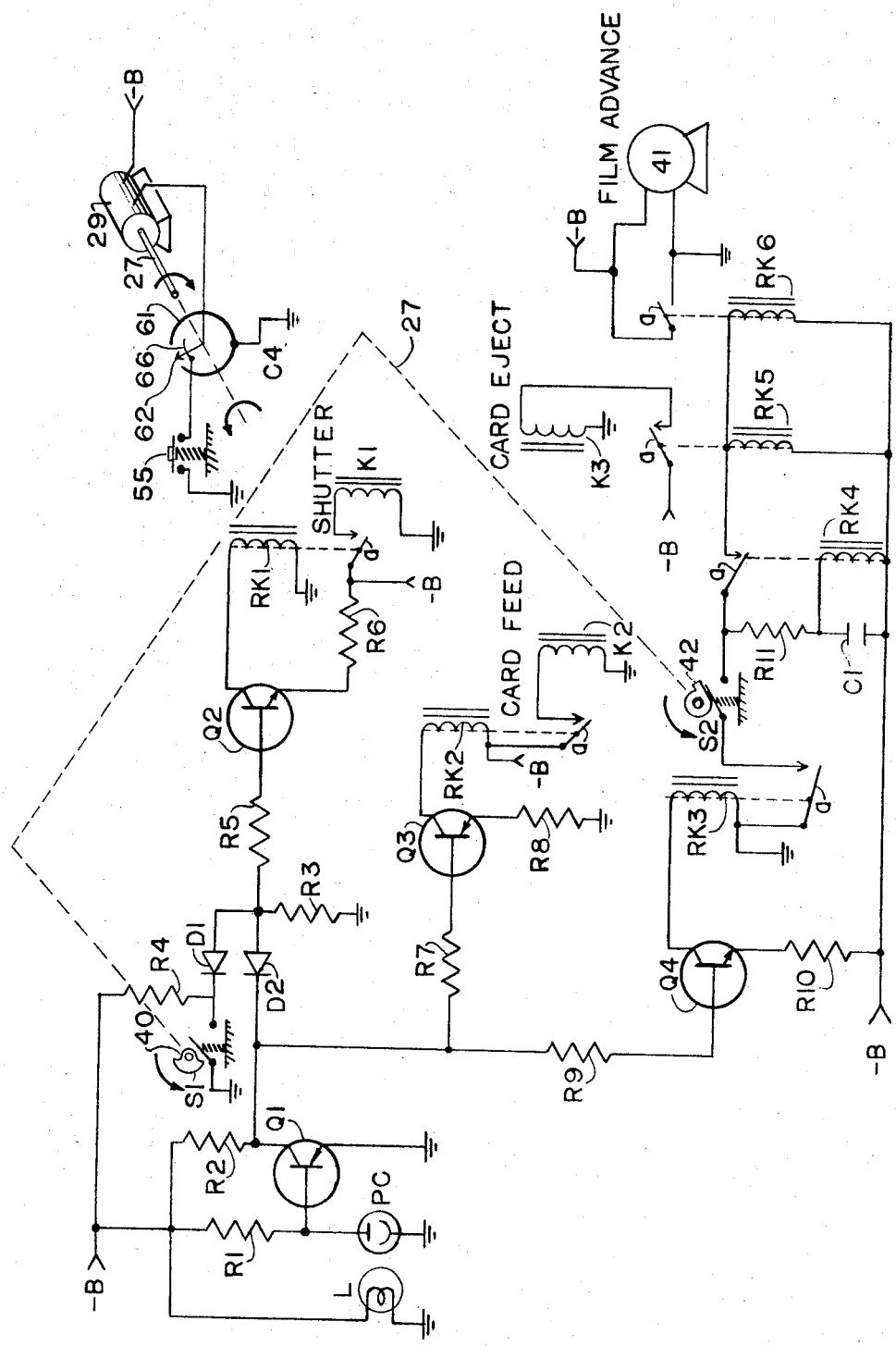
FIG. 4 is a schematic wiring diagram of control circuits for the apparatus of FIGS. 2 and 3.

In addition to such portions of the card as may be encoded in a conventional manner, to facilitate location and handling of the card with conventional data-processing apparatus, the card includes a rectangular region suggested by the dotted lines 3 within which are recorded rows of data such as the rows R1, R2 and R3. There is one such row for each different color in the image to be recorded. Theoretically, only red, green and blue violet would be necessary. In practice, because of the response characteristics of the apparatus with which information on the card is gathered, and the response characteristics of the emulsion upon which it is to be recorded, it is possible to gain considerable additional information by using a larger number of colors.

Each row such as R1 corresponds topologically to a line in the image to be recorded, and for that line, encodes one color component of the image in the form of a punched hole for each of the set of points on the line at which the image is to include the color associated with the row, and an opaque, unpunched portion where that color at that point in the image is absent.

In the practice of my invention, each card such as 1 is placed over a composite filter 7 comprising adjacent strips 9 of a transparent optical filter material such as optical glass, optical gelatin, or the like. Each strip constitutes a filter which will transmit light of a different color C1, C2 and C3, etc. each corresponding to different one of the recorded rows of information, R1, R2, R3, etc.

Referring now to FIGS. 1 and 2, the composite filter 7 is associated with an illuminating and image forming apparatus in such a manner that when a card 1 in layed over the filter 7 a color image of the filter as seen through the punched holes in the card may be produced. Generally speaking, the apparatus for that purpose is essentially that employed in a conventional photographic enlarger. Thus, in a suitable lamp housing 2 there is arranged a source of white light, such as the photoflood lamp 11, below which a light diffuser plate 13, of opalescent glass or the like, is arranged. The apparatus may be associated with conventional card-feeding apparatus here shown schematically as comprising a card supply hopper 15. Arranged beneath the hopper 15 is a card stop 4 retractable by a card feed solenoid K1 to permit a card to drop into position over the filter 7. When in position, the card is retained by a second card stop 6 until the latter is momentarily retracted by a card eject solenoid K3. As is also conventional in such card handling apparatus, a card-receiving bin 17 may be disposed to receive the cards after processing in the recording apparatus of my invention.

Disposed in a suitable lighttight box 19 is a conventional shutter 21 actuable to admit light passing through the filter to a lens 23. The shutter is arranged to be opened when a solenoid K1 is energized. The lens 23 forms a reduced image in the vicinity of a rotatable mirror 25, to be described.

The mirror 25 is rotatably secured to the housing as suggested at 30 in FIG. 2 and engages a cam 26 mounted on the output shaft 27 of a convention electric motor 29. The mirror shaft is parallel to the elements 9 in the filter 7. As shown in FIG. 2, the mirror is urged against the cam by a spring 28 and thus caused to follow the cam.

For layout convenience, adjacent the mirror 25, and fixed in the housing 19, is a mirror 31 having a reflecting surface confronting the mirror 25. The surface of the mirror 31 is parallel to the mirror 25 when the latter is at 45° to the plane of the filter 7.

Below the mirror 31 is arranged a film holder 33 in which a sheet of color film 35 may be held in a plane at 45° to the plane of mirror 31. Above the film holder 33 and the film 35 is a mask 37 fixed in the housing 19. In the mask 37 is formed a slit 39 to admit light to the film 35 along a line corresponding topologically to a line encoded on one of the cards 1.

The film holder 33 is arranged to be moved incrementally by a stepping motor 41 having a shaft 43 connected to a pinion 49 engaging a rack 51 formed on the film holder 33. The stepping motor 41 may be controlled in a manner to be described in connection with FIG. 4 to advance the film holder 33 one step at a time to advance the film from one line position to the next. As best shown in FIG. 3, a particular ray of light passing through the filter 7, such as the ray 57, will be transmitted through the mask 37 at a location that moves across the mask as the mirror 25 is rotated. Thus, the dotted ray 57' corresponds to the new position of the ray 57 when the mirror 25 is moved to the position shown in dotted lines at 25'. By that arrangement, for each of the filter strips 9 there will be one angle of the mirror 25 at which the image of the strip as seen through the card 1 will be admitted to the film 35 through the slit 39. Accordingly, during a portion of each complete revolution of the motor shaft and the cam 26 each of the digitally encoded color signals on the card 1 will be recorded on the same line on the film.

FIG. 4 shows control apparatus suitable for actuating the color printer of FIGS. 2 and 3. The apparatus is there schematically shown as supplied by a conventional direct current power source having one terminal connected to ground and a second terminal at a negative potential −B. The apparatus comprises a photocell PC and a lamp L mounted in the housing 2 on opposite sides of the card station so that the photocell will be illuminated, and therefore exhibit a low resistance, when no card is in scanning position over the filter 7. WHen a card is dropped into position, it masks the photocell PC from the lamp and causes the photocell to assume a high impedance. The lamp is shown connected directly between the power terminal −B and ground, although it will be obvious that an on-off switch could be provided if desired.

The photocell PC is connected in series with a resistor R1 across the power supply. The junction of the photocell and the resistor R1 is connected to the base of a conventional PNP transistor Q1. The collector of the transistor Q1 is returned to the terminal −B through a resistor R2.

When the photocell is illuminated, the transistor Q1 will be cut off and its collector will assume the potential −B. When the photocell illumination is interrupted by a card, the transistor Q1 will be forward biased and its collector will go essentially to ground potential.

The shutter control solenoid K1 is at times energized over a front contact $a$ of a relay RK1. The winding of the relay RK1 is connected between ground and the collector of an NPN transistor Q2.

The emitter of the transistor Q2 is returned to the terminal −B through a resistor R6. The base of the transistor Q2 is returned to ground through two resistors R5 and R3 in series.

The potential at the junction of the resistors R3 and R5 is controlled by an AND gate comprising a pair of diodes D1 and D2. The cathode of the diode D1 is connected to the terminal −B through a resistor R4, and is also connected to one terminal of a cam-operated switch S1 that has its other terminal connected to ground. The cathode of the diode D2 is connected to the collector of the transistor Q1.

The resistors R3 and R5 are chosen so that when either the switch S1 is opened or the transistor Q1 is not conducting, such that one of the diodes D1 and D2 is forward biased, the potential at the base of the transistor Q2 will be negative with respect to the emitter and the transistor will be cut off. However, when both the switch S1 is closed and the transistor Q1 is conducting, such that both of the diodes D1 and D2 are blocked, the emitter of the transistor Q2 will be forward biased and the relay RK1 will be energized, thereby energizing the shutter K1 and opening the shutter 21.

The cam 40 controlling the closing of the switch S1 is connected to the output shaft 27 of the motor 29 and is formed to close the switch S1 over the shaft angle of the motor in which the mirror 25 scans the filter 7 and transmits the optical information, supplied through the card 1 and the filter 7, through the slot 39 to one line on the film 35.

The card feed solenoid K2 is at times energized over the front contact $a$ of a relay RK2. The winding of the relay RK2 is connected between the terminal −B and the collector of a PNP transistor Q3.

The emitter of the transistor Q3 is returned to ground through a resistor R8. The base of the transistor Q3 is connected through a resistor R7 to the collector of the transistor Q1. By that arrangement, when the transistor Q1 is conducting, the transistor Q3 will be reverse biased and cut off. When the transistor Q1 is not conducting, the transistor Q3 will be forward biased, energizing the relay RK2 and thereby energizing the card feed solenoid K2.

The card eject solenoid K3 and the film advance stepping motor 41 are energized by a pulsing circuit next to be described. The circuit comprises an NPN transistor Q4 having its base connected to the collector of the transistor Q1 through a resistor R9. The emitter of the transistor Q4 is connected to the terminal −B through a resistor R10. The collector of the transistor Q4 is connected through the winding of a relay RK3 to ground. By that arrangement, when the transistor Q1 is conducting, the transistor Q4 will be forward biased and energize the relay RK3. When the transistor Q1 is cut off, the transistor Q4 will also be cut off.

The relay RK3 is provided with a front contact $a$ that is connected in a circuit extending from ground over the contact $a$ in the energized state of the relay RK3, over a normally open cam operated switch S2, through a resistor R11, and through the winding of a relay RK4 to the terminal −B. A capacitor C1 is connected in parallel with the winding of the relay RK4.

The relay RK4 has a back contact $a$, closed when the relay is deenergized, that completes an energizing circuit for two relays RK5 and RK6 whose windings are connected in parallel.

The relay RK5 has a front contact $a$, closed when the relay is energized to energize the card eject solenoid K3. The relay RK6 is provided with a front contact $a$, closed when the relay is energized to complete an energizing circuit for the film advance stepping motor 41.

The resistor R11 and the capacitor C1 are selected to have a time constant that will delay the energization of the relay RK4 for a time appropriate to produce an energizing pulse for the relays RK5 and RK6, over the back contact $a$ of the relay RK4, to cause the film advance motor to step the film holder one line position and to energize the card eject solenoid long enough to pull the stop 6 out of the way to allow the card 1 to drop into the bin 17.

The cam-operated switch S2 is provided with a cam 42 connected to the shaft 27 of the motor 29. The cam 42 is arranged to close the switch S2 momentarily at a shaft angle of the motor 29 beyond the angle over which the switch S1 is closed.

The motor 29 is provided with an energizing circuit that extends from the terminal −B through the winding of the motor and thence to ground over one of two alternate paths in dependence on the state of a circuit controller 61 having a wiper 62 connected to the shaft 27. Over the shaft angle including the angles in which the switches S1 and S2 are sequentially closed and opened, the motor control circuit is completed over a contact 64. Over another portion of the shaft angle, that circuit is opened and a circuit is completed between the wiper 62 and a contact 66. That circuit extends to ground when a normally open spring-returned pushbutton 65 is depressed. By that arrangement, when the pushbutton 65 is momentarily depressed, the motor 25 will be caused to make one revolution and then stop until the pushbutton is again depressed.

The operation of the apparatus of my invention will next be described in connection with FIGS. 2, 3 and 4. It will be assumed that a card is in position over the filter 7, resting on the stop 6, so that the photocell P7 is not illuminated and the transistor Q1 is conducting, and that there is a second card on the stop 4. It is further assumed that there is an unexposed film 35 in the film holder 33 with the latter in such position relative to the mask 37 that the first line to be recorded is exposed by the slit 39.

The card 1 that is in position on the stop 6 bears the coded information for the first image line to be recorded, and the card 1 on the stop 4 bears the information for the second line to be recorded. Assuming now that the pushbutton 55 is momentarily depressed, the motor 29 will be energized, first over the contact 66 and then over the contact 64 in FIG. 4, and will begin to rotate the cam 26. The mirror 25 will begin to rotate, and when it comes into scanning position, the switch S1 will close. With the switch S1 closed and the transistor Q1 conducting, both the diodes D1 and D2 will be blocked, causing the transistor Q2 to conduct and energizing the relay RK1 and the shutter solenoid K1. The first line on the film will then be exposed as the mirror 25 rotates, until the exposure is completed when the switch S1 will open. The shutter will then be closed.

With the transistor Q1 conducting, the transistor Q4 will be conducting and the relay RK4 will be energized. Its contact $a$ will be closed, and when the switch S2 is closed, the card eject solenoid K3 will be energized to release the card 1 into the bin 17 and to step the film advance motor 41 to move film to the next record position. The motor 29 will continue to rotate until its circuit is interrupted, whereupon it will stop. In the meantime, when the card 1 drops away from the recording position, the photocell PC will be illuminated and the transistor Q1 will be cut off. That will cause the transistor Q3 to be forward biased, energizing the relay RK2 and the card feed solenoid K2 to cause the next card 1 to drop into position. The photocell PC will be obscured, causing the transistor Q1 to conduct and returning the apparatus to its initial condition. The recording of the second line is then accomplished by momentarily depressing the push button 55 again, whereupon the second line will be recorded in the same manner as described for the first line. The recording process is continued in this fashion until the full film is exposed. The film is then developed in a conventional manner.

It will be apparent that the resolution attained will be determined by a number of factors, among others the number of data bits in each data row on the card 1, the extent to which the image of the row is reduced by the lens 23, the width of the slit 39, and the increments of movement of the film from one line to the next. As an example, a resolution of 100 lines per inch would require approximately one hundredth of an inch increments of film movement from one line to the next, a slit width of one hundredth of an inch or less, and 1 data cards per inch in one dimension of the recording on each of which there are 100 bits per inch (in the reduced image of the card) of data, for each color, in the other dimension of the recording.

It will be apparent that the speed of the motor 29 will determine the exposure time of each data line on the cards 1. The necessary exposure for one color, and the corresponding motor speed can readily be determined to suit the lamp 11, filter 9 and emulsion 35. In general, that exposure would not be optimum for the other colors. The correct balance may be obtained by adjusting the transmissivities of the several color filters 9, as by sandwiching them with neutral density filters of appropriate transmissivities.

If desired, the mirror 31 in FIGS. 2 and 3 can be omitted, and the filmholder placed in the optical path from the mirror 25. In addition, while the mirror 25 forms a part of the preferred embodiment of my invention, other light-diverting means, such as a prism or the like, could be employed without departing from the scope of my invention in its broader aspects.

While I have described my invention with respect to numerous illustrative details, many changes and variations will be apparent to those skilled in the art upon reading my description, and such may obviously be made without departing from the scope of my invention.

Having thus described my invention, what I claim is:

1. The process of recording a color image on a color-sensitive emulsion comprising the steps of placing a mask over the emulsion in which there is a slit corresponding to a line in the image to be recorded; exposing the film through the slit, a first color filter transmitting light of a first color, and a first mask bearing a row of transmissive regions each corresponding to an occurrence of light of the color transmitted by the first filter in the image to be recorded; exposing the film through the slit, a second color filter transmitting a second color and a second mask comprising a row of transmissive regions one for each occurrence of the second color in the image to be recorded; moving the film relative to the first mask; and recording another line by repeating the steps by which the first line was recorded with different masks corresponding to the distribution of colors in that line in the image to be recorded.

2. In the process of recording a color image on a color sensitive emulsion, the steps of masking the emulsion by covering it with a mask having a slit positioned to expose a first line on the emulsion, recording an image on the first line by distributing a first sequence of light signals of a first color over the exposed line, and distributing at least a second sequence of light signals of a second color over the exposed line, moving the mask to expose a second line on the emulsion, and recording an image on the second line by repeating the steps by which the image on the first line was recorded using different sequences of light signals of said first and at least said second color.

3. Apparatus for producing a color image recorded on a record medium as a rectangular array of regions each being opaque or transparent in accordance with the binary value of a data bit, there being a predetermined number of linear rows of said regions in said array, each row corresponding to a different color in the image to be recorded and each row comprising a digital encoding of the distribution of the color associated with the rows along a line in the image to be recorded, said apparatus comprising a color filter comprising an array of parallel filter strips each corresponding in shape and arrangement with a different one of the rows on said record medium and each selectively transmitting light of the color associated with its corresponding row, a light source, means for mounting said light source and said composite filter in spaced relation, whereby when the record medium is placed between the source and the composite filter the filter will transmit a series of light signal sequences determined by the record medium, a filmholder, a mask provided with a slit and adapted to cover a sheet of film in said filmholder except for a line exposed by the slit, means mounting the filmholder and mask for relative movement over a range in which the slit sweeps the surface of a sheet of film in said filmholder, and light-diverting means rotatably mounted adjacent said filter to sequentially direct images of the light signal sequences from said filter onto said slit.

4. The apparatus of claim 3, further comprising motor means actuable to rotate said light diverting means, a shutter mounted between said color filter and said light-diverting means, detecting means for producing a signal when a record medium is in position between said light source and said color filter, and means controlled by said motor means and said detecting means for opening said shutter when said light-diverting means is in a predetermined range of rotated positions and said signal is present.

5. A digital color printer, comprising a set of color filters each transmitting light of a different color, a light source, means mounting said light source and said filter in spaced relation, means for mounting an optically coded mask between said filters and said light source to limit the light passing through each filter to a coded distribution determined by the mask, sheet-holding means, a mask provided with an aperture and adapted to cover a sheet of light-responsive material in said sheet-holding means except for a region exposed by said aperture, means mounting said sheet-holding means and said mask for relative movement over a range in which the aperture sweeps the surface of a sheet of light-responsive material in said sheet-holding means, and light-diverting means movably mounted adjacent said filters for movement over a range in which images of the coded light distributions transmitted by said filters are sequentially directed onto said aperture.

6. The apparatus of claim 5, further comprising motor means connected to said light-diverting means and actuable to move said light-diverting means over a path including said range of movement, a shutter mounted between said filters and said light-diverting means, detecting means responsive to an optically coded mask between said filters and said light source for producing a signal, and means controlled by said motor means and said detecting means for opening said shutter when said light-diverting means is in said range of movement and said signal is present.